United States Patent [19]

Morane et al.

[11] 4,404,922
[45] Sep. 20, 1983

[54] AGEING INDICATOR

[75] Inventors: Bruno P. Morane, Neuilly, Gilbert L. Legras, Chatillon, both of France

[73] Assignee: L'Oreal, Paris, France

[21] Appl. No.: 173,237

[22] Filed: Jul. 28, 1980

[30] Foreign Application Priority Data

Aug. 3, 1979 [FR] France ............................... 79 19954

[51] Int. Cl.³ ........................ G01D 21/00; G04F 1/04
[52] U.S. Cl. ..................................... 116/206; 116/308; 194/DIG. 18; 368/93; 368/327; 422/88
[58] Field of Search ................. 116/219; 368/89, 114, 368/93, 94, 327; 73/339 R; 426/88; 194/DIG. 18

[56] References Cited

U.S. PATENT DOCUMENTS

| Re. 27,556 | 1/1973 | Corrsin | 368/114 |
|---|---|---|---|
| 2,308,087 | 1/1943 | Lappala | 73/356 |
| 2,540,502 | 2/1951 | Aschbacher | 368/93 |
| 2,677,278 | 5/1954 | Smith et al. | 73/358 |
| 2,716,065 | 8/1955 | Beckett et al. | 116/207 |
| 2,782,749 | 2/2957 | Beckett et al. | 116/207 |
| 3,018,611 | 1/1962 | Biritz | 426/88 X |
| 3,047,405 | 7/1962 | Lanier | 116/217 X |
| 3,414,415 | 12/1968 | Broad, Jr. | 116/219 |
| 3,844,718 | 10/1974 | Cohen | 73/356 |
| 3,946,611 | 3/1976 | Larsson | 116/216 X |
| 3,948,604 | 4/1976 | Hoppesch | 73/1 G |
| 3,967,579 | 7/1976 | Seiter | 73/358 |
| 3,981,683 | 9/1976 | Larsson | 116/219 X |
| 4,038,873 | 8/1977 | Kimmel | 73/358 |
| 4,057,029 | 11/1977 | Seiter | 116/219 |
| 4,134,359 | 1/1979 | Redpath | 116/219 |

FOREIGN PATENT DOCUMENTS

| 1548424 | 10/1966 | France | 116/216 |
|---|---|---|---|
| 2,016,505 | 5/1970 | France | 116/216 |
| 2101598 | 3/1972 | France | 116/216 |
| 2323135 | 1/1977 | France | 116/216 |

*Primary Examiner*—Daniel M. Yasich
*Attorney, Agent, or Firm*—N. Jerome Rudy

[57] ABSTRACT

An ageing indicator compares a closed sachet of one or more closed tubes of a material which is slightly permeable to a fluid contained in the sachet or tube. The rate of permeation of the fluid through the sachet-like assembly tube wall depends upon temperature and time of exposure to that temperature so the quantity of fluid loss is indicative of temperature and time; the ageing capable of then being detected either by measuring a column of the liquid in a tube or by observing the appearance or disappearance of printed indicia in the sachet.

17 Claims, 8 Drawing Figures

AGEING INDICATOR

The present invention relates to an ageing indicator, the purpose of which is to indicate the condition of a perishable product.

It is known that numerous commonly consumed products such as foodstuffs, pharmaceutical products or cosmetic products are perishable commodities, the properties or characteristics of which deteriorate in the course of time. It is for this reason that it has become customary to indicate, on certain merchandise, limiting dates for use or sale. When this date has passed, it is known that the products in question have lost their essential qualities or are unsuitable for consumption.

However, time is only one parameter which provides an imperfect measure of the ageing phenomenon of perishable commodities. In fact, other main factors influence the deterioration of the products. In particular, these factors are relative humidity, radiation, oxidation and temperature. Although the choice of packaging frequently makes it possible to reduce the action of the first three parameters it is more difficult, on the other hand, to provide isothermal conditions which are both effective and inexpensive whereupon the product can be subjected to considerable temperature variations during its existence. This is so in, particular, during transportation in ships' holds or during storage on railway station platforms.

It has thus become necessary to devise means, affixed to the perishable commodities, for monitoring the temperature. Miniaturised temperature recorders may be mentioned amongst these means. But, devices of this type are expensive; the time for which they function on their own is too short (about one month). Furthermore, the measurements can only be interpreted by a qualified person. Admittedly, less expensive means consisting of strips provided with temperature-indicating discs have been proposed. Their color change indicates the maximum temperature to which the merchandise has been subjected. However, systems of this type do not give information on the period of exposure to that temperature. Furthermore, it frequently happens that on ageing the temperature-indicating discs deteriorate and no longer provide the expected indication.

Thus the means which have been used hitherto, whether these be miniaturised temperature recorders or temperature-indicating discs, do not make it possible to integrate the temperature variations over prolonged periods of time in order to give a representation of the ageing of the commodities to which they are affixed.

The object of the present invention is to produce an ageing indicator which is capable of integrating the action of temperature and of time, and which makes it possible to assess the ageing of the products to which the indicator is affixed simply by means of reading.

According to the invention there is provided an ageing indicator intended to be associated with merchandise whose ageing of which is desired to be evaluated, wherein the indicator consists of at least one closed envelope which defines a single compartment and which contains at least one fluid capable of diffusing or migrating to the outside of the said at least one envelope through at least part of the said envelope as a function of the time and the temperature, whereby the ageing of the associated merchandise can be evaluated by determining the amount of fluid lost through the said at least one closed envelope.

This indicator is based on the principle of the diffusion of a fluid, in the liquid or gaseous state, through a permeable membrane. It is known that for a temperature $T_o$, the expression for the amount of gas passing through a membrane is of the form:

$$q_{T_o} = K(S/e)t(P_{int} - P_{ext})$$

in which formula:

$q_{T_o}$ = amount of gas, in cm$^3$, passing through the membrane at the temperature $T_o$ (expressed in °K.)
$K$ = coefficient of permeability
$e$ = thickness of the material in mm
$S$ = surface area (m$^2$)
$t$ = time (days)
$P_{int} - P_{ext}$ = difference in the gas pressure between each face of the membrane (in bars).

If the temperature varies, then the diffusion varies in accordance with Arrhenius' law:

$$(q_T/q_{T_o}) = C e^{-E/RT}$$

in which formula:

$T$ = temperature in °K.
$C$ and $E$ = constants characteristic of the membrane/product pair
$R$ = ideal gas constant
$q_T$ and $q_{T_o}$ = amounts of gas (in cm$^3$) passing through the membrane at the temperatures $T$ and $T_o$, respectively, expressed in °K.

Thus, for a membrane having a permeability to fluids which obeys Arrhenius' law, the amount of fluid which passes through this membrane is a direct function of the time and the temperature. Consequently, determination of the amount of fluid lost can make it possible to evaluate the degree of ageing of a commodity to be monitored. This measurement of the amount of fluid lost can of course be carried out by weighing in the case where the permeable membrane constitutes, for example, a closed sachet which contains a fluid. The sachet in question can be associated with merchandise whose ageing is desired to be measured. In this case, the measurement of the amount of fluid lost is carried out by weighing the sachet directly and by subtracting the resulting weight from the initial weight of the sachet. As a variant, rather than weighing in order to determine the amount of fluid lost the variation in the level of fluid, for example of liquid inside a permeable envelope, can advantageously be determined. In this variant, the permeable envelope is advantageously in the form of at least one tube closed at both ends. Under the effect of temperature and time, the tube gradually loses the liquid which it contains, and, by means of a scale placed at the side of the tube, the indication of the ageing is provided by reading off the level of the liquid.

It is appropriate to choose a membrane which, as a function of the temperature and the time, only allows a very small amount of fluid to pass through. This, on the one hand, is for the purpose of preventing the soiling of the merchandise with which the ageing indicator is associated and, on the other hand, in order to be able to evaluate the ageing over relatively long periods of time. In this respect, it has been observed that membranes made of customary plastics materials, such as polyethylene, polypropylene and polyvinyl chloride, are suitable. As has been seen, the principle on which the indicator according to the invention functions is well known, but hitherto it has never been proposed to measure the ageing of commodities by determining the amount of fluid lost through a permeable membrane. In the same way, it was already known that the majority of plastics materials were not totally impermeable, but allowed small amounts of fluid to pass through during prolonged storage. The property of these plastics materials, which can constitute a serious disadvantage in the packaging of liquids, is utilised in the present invention in order to produce the membrane of the ageing indicators. In this application the permeability of the plastics material is no longer a disadvantage but, quite on the contrary, is an essential characteristic.

In a preferred embodiment of ageing indicator according to the invention, the closed permeable envelope is in the form of a tube or a sachet; the closed permeable envelope is made of plastics material; and the plastic used is chosen from the group comprising polyethylene, polypropylene, polyvinyl chloride, polymers of acrylonitrile and polymers of ethylene terephthalate, polystyrene, acetate polymers, and elastomers. The wall of the closed permeable envelope can be made solely of plastics material. But, it can also consist of a laminate or of a complex in which one of the layers is plastic, for example a plastic/metal complex or plastic/paper complex. The closed permeable envelope preferably contains water, alcohols, solvents or mixtures thereof. Ethyl alcohol, isopropyl alcohol, butyl alcohol and the like may be mentioned amongst the alcohols which can be used in the present invention. Benzene, chloroform, carbon tetrachloride, toluene and the like may also be mentioned amongst the solvents which can be used in the present invention. In addition to the above-mentioned liquids, the vapours originating from sublimable solids, such as, for example, the vapours from camphor, polyoxymethylene, lauric acid and the like, can also be used as the fluid capable of diffusing or migrating to the outside of the closed permeable envelope.

Advantageously, until it is to be used the ageing indicator is placed inside an impermeable covering, for example made of aluminium foil.

In a first modified embodiment, the ageing indicator is in the form of at least one plastic tube, preferably of uniform wall thickness, and this tube is associated with a graduated scale. The ageing is assessed by determining the level of the residual liquid inside the tube, relative to the graduations on the scale. Each graduation can correspond to a time at constant temperature, for example at 22° C.; the time can be expressed, for example, in weeks, months or years at a determined constant temperature.

In other methods of use an ageing scale, which is specific to the perishable commodity with which the ageing indicator is intended to be associated, is determined as follows:

(a) the measurable criterion (or criteria) of the parameter Q of the product is (or are) sought (this can be, for example, the concentration of the most unstable active ingredient, the rating of an organoleptic property or the change in the coalescence of an emulsion);

(b) parallel ageings of the indicator and of the packaged perishable commodity for which it is desired to measure the deterioration in the parameter Q are carried out; and (c) by comparing these two parallel ageings, a scale can be established which directly carries marks corresponding to the deterioration of the commodity to be monitored, for example marks indicating that the commodity must be checked before being sold, or marks showing the expiry of its normal shelf life.

In a second modified embodiment, the indicator according to the invention is intended to give only one indication of the ageing of the commodity to be monitored, in particular the end of normal use of a product. This is done by causing the appearance of a text or symbols indicating, for example, that the product associated with the ageing indicator can no longer be consumed. In this case the ageing indicator consists of a closed permeable sachet one of whose large faces carries the time-limit information, whilst the other large face through which the information is read is transparent, the above-mentioned sachet being filled with an opaque liquid which obscures the information. On ageing, the sachet gradually loses the opaque liquid so that the time-limit information finally appears through the transparent wall of the sachet. Examples of opaque liquids which can be used are water and colored solvents, and also opaque emulsions which become transparent on the elimination of a volatile constituent.

In a third modified embodiment, the indicator still only gives one indication of the ageing of the commodity to be monitored, but it allows indications to appear during the period of normal use of the product. These indications disappearing when the associated product has deteriorated as a result of the ageing. As previously, the ageing indicator is in the form of a sachet filled with a liquid. One of the large faces of the sachet carries indications, texts or symbols, whilst the opposite or other large face through which the information is read consists of a translucent film which remains transparent when it is in contact with the liquid contents of the sachet, for example with alcohol or water. The translucent film can be made of polypropylene. After ageing, when the sachet is empty, the film again becomes translucent and prevents the information from being read.

For certain commodities, the deterioration in their properties can accelerate suddenly if the temperature exceeds a limiting temperature for stability. The ageing indicator can thus give a false indication of the deterioration of the product if the latter has been subjected to a temperature which is higher than the limiting temperature for stability. Consequently, it is appropriate to associate the ageing indicator according to the invention with a temperature indicator which shows any excess over the limiting temperature for stability of the commodity. The limiting temperature indicator can, for example, consist of an irreversible heat-sensitive ink, or waxes or paraffins, the melting point of which is the limiting temperature of the commodity.

The present invention also provides a process for evaluating the ageing of merchandise. This process consists of associating the merchandise whose ageing it is desired to follow with at least one closed envelope having a permeable wall through which at least one fluid from within the envelope can migrate as a function of the time and the temperature, wherein the envelope used defines a single compartment which contains the above-mentioned fluid, all or part of the wall of which is constituted by the said permeable wall; and evaluating the ageing by determining the amount of fluid lost from the said envelope through said permeable wall.

In order to provide a better understanding of the present invention two embodiments thereof will now be described below by way of purely illustrative and non-limiting examples, with reference to the attached drawing in which.

Figure 1:
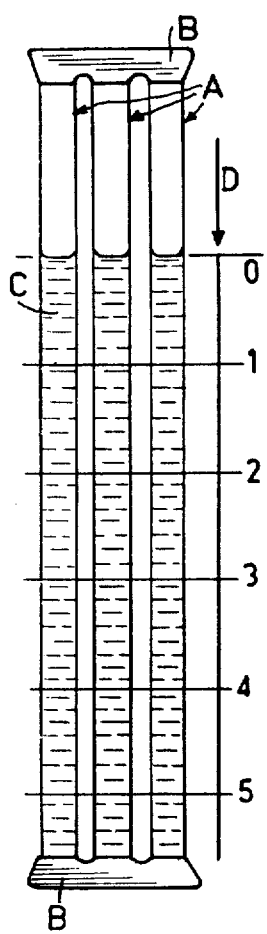
FIG. 1 shows, in elevation, an ageing indicator according to the invention.

With reference to FIG. 1 of the drawing, it will be seen that the ageing indicator in this example consists of three tubes (A) made of polyethylene and having an external diameter of substantially 4.5 mm. The three tubes (A) contain colored absolute alcohol (C). These three tubes are hermetically welded at their ends (B). Their length is 130 mm. The initial height of the column of colored absolute alcohol in each of the three tubes (A) is 100 mm.

Three tubes are used in order to overcome the problem of possible variations in the thickness of the material of the tube wall, or possible non-uniformities of its crystalline state or of its plasticisation, and more generally in order to provide a better representation of the factors capable of jeopardising the reproducibility of the gas permeability of the tubes.

Figure 2:
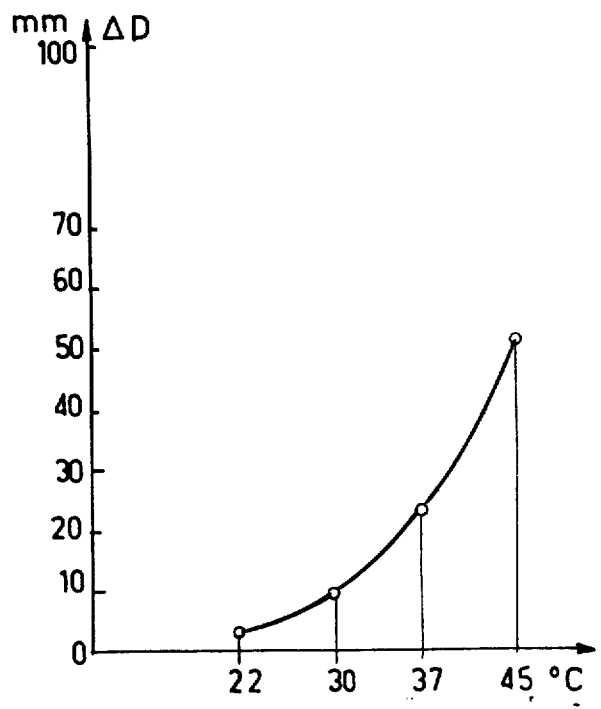
FIG. 2 shows the graph of the lowering of the liquid level in the indicator of FIG. 1, after two months and for four different temperatures.

FIG. 2 shows the lowering of the alcohol level after an isothermal period of two months for the following four temperatures: 22°, 30°, 37° and 45° C. The temperature is plotted on the abscissa and the average lowering δD of the alcohol level (expressed in millimeters) inside the tubes (A), after two months, is plotted on the ordinate.

Figure 3:
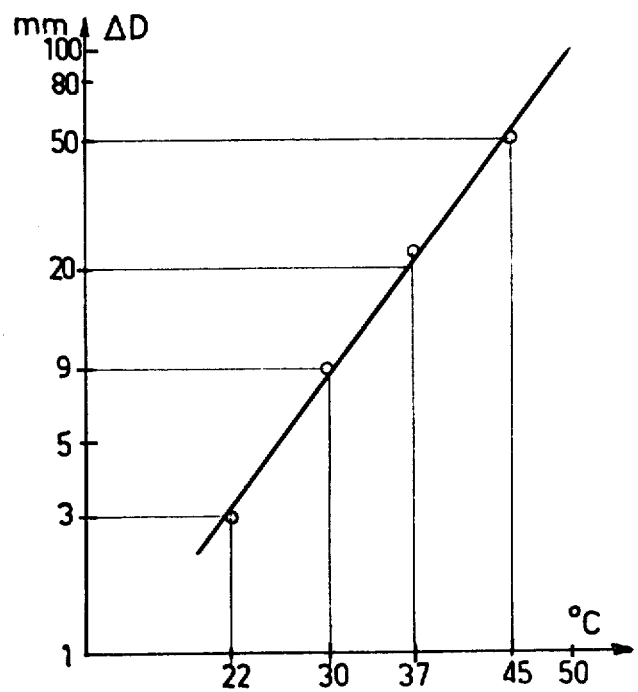
FIG. 3 shows the graph of FIG. 2 with logarithmic coordinates.

FIG. 3 shows the graph of FIG. 2 with semi-logarithmic coordinates. It is found that the diffusion of the alcohol through the walls of the tubes (A) obeys Arrhenius' law.

The ageing indicator of FIG. 1 has a graduated scale (D) and each graduation corresponds to an ageing equivalent to one year at a constant temperature of 22° C. Thus, the last graduation marked "5" corresponds to five years at 22° C. As a variant, the indicator of FIG. 1 could have been associated with a scale indicating the deterioration of the commodity with which the indicator of FIG. 1 is intended to be associated.

It is clear that the characteristics of the indicator of FIG. 1 can easily be adapted in order to modify its lifetime, its sensitivity and its ability to represent the ageing of the commodities to be monitored, without thereby going outside the scope of the invention as claimed herein.

FIGS. 4 to 8 show an ageing indicator which is used to indicate the end of use, e.g., the expiration of the shelf life, of a commodity. The indicator shown consists of a sachet formed by welding two sheets 1a, 1b edge to edge. The two sheets 1a, 1b form a square with a side length of 4 cm. They are made of transparent plastic (cellophane/polyacrylonitrile complex) and have a total thickness of about 0.05 mm. An aluminium foil 2, on which time-limit information 3 is printed, is permanently fixed to the face 1b of the sachet. Initially, the sachet is filled with an opaque liquid 4, such as, for example, colored water.

Figure 4:
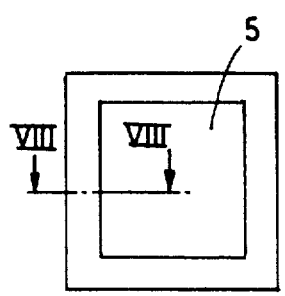
FIGS. 4, 5 and 6 show an ageing indicator, the purpose of which is to cause the appearance of time-limit information, the indicator being represented before use, during ageing and after the appearance of the time-limit information.
Figure 5:
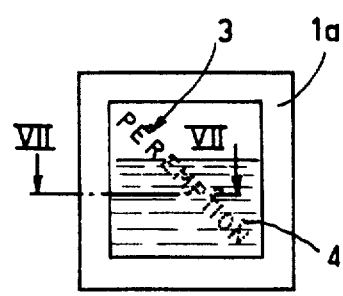
Figure 6:
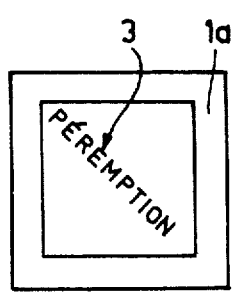
Figure 7:
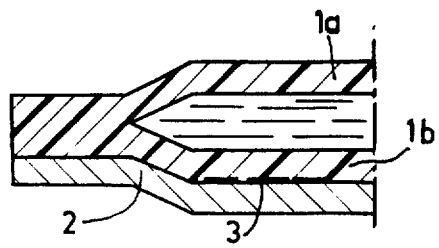
FIG. 7 shows a section along the line VII—VII of FIG. 5.
Figure 8:
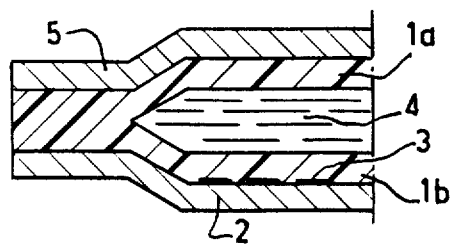
FIG. 8 shows a section along the line VIII—VIII of FIG. 4.

FIG. 4 shows the ageing indicator before use, that is to say before it is affixed to the commodity to be monitored. In order to prevent any diffusion of the liquid through the face 1a of the sachet, the said face is covered with a detachable aluminium foil 5. Thus, the ageing indicator is covered with an impermeable envelope consisting of the two aluminium foils 2 and 5, so that loss of liquid through the sachet wall cannot occur. At the time when the indicator is associated with the commodity to be monitored, the aluminium foil 5 is detached so that the liquid can diffuse through the transparent wall 1a. If desired, the indicator can be fixed to the commodity or to its packaging via its face 1b-2. The sachet gradually loses its colored liquid 4 (FIG. 5) as a function of the time and the temperature. This finally makes it possible, by virtue of transparency of the empty sachet, to read the time-limit information through the face 1a of the sachet.

In another variant, the wall 1a of the sachet can consist of a translucent film made of polypropylene, which remains transparent whilst it is in contact with the liquid 4, which can, for example, be alcohol or water. In this variant the user can, by virtue of transparency of the sachet wall, read through the face 1a of the sachet information showing for example that the product can be used for as long as this information can be read. When the sachet is completely empty, that is to say once the commodity has lost its essential qualities as a result of the natural ageing or is otherwise unsuitable for consumption, the face 1a of the sachet which is no longer in contact with the liquid becomes translucent and prevents the information from being read.

Of course, the embodiments described above in no way imply a limitation and can form the subject of any desirable modifications without thereby going outside the scope of the present invention as defined by the following claims.

We claim:

1. An ageing indicator intended to be physically associated by affixation or placement or placement with merchandise whose ageing-phenomenon-characteristic and age is and are disired to be evaluated, wherein:

the indicator consists of at least one closed envelope which defies a single compartment; in which said at least one closed envelope in said indicator is constituted of a plastic material of construction that is selected from the Group consisting of: polyethylene; polypropylene; polyvinyl chloride; polymers of acrylonitrile; polymers of ethylene terephthalate; polystyrene; acetate polymers; and elastomers; with said at least one closed envelope being in the form of at least one tube means or sachet of a plastic material of construction as defined in the foregoing; and also wherein it is intended to give only one indication of the ageing of the merchandise to be monitored, this indication consisting of information printed on the indicator; and further with said tube means or sachet being of a closed construction which has two large faces thereon, one of which large faces carries information whilst the other large face through which said information is read is transparent; and at least one opaque fluid product being contained in said at least one envelope, said opaque fluid product being selected from the Group consisting of: water; colored solvents; and opaque emulsions which become transparent on the elimination of a volatile constituent;

said opaque fluid product being further capable of migrating to the outside of said at least one envelope in which it is contained and therethrough so as to traverse at least part of the said at least one envelope;

said opaque fluid product being still further capable of generating the said migrating fluid; and the migration of fluid occurring as a function of time involved during the migration and the ambient temperature or temperatures affecting said merchandise; whereby the ageing of the associated merchandise can be evaluated by mere sighting of the relevant said information printed and thereupon capable of appearing on the said indicator faces.

2. An ageing indicator intended to be physically associated by affixation or placement with merchandise whose ageing-phenomenon-characteristic and age is and are desired to be evaluated, wherein the indicator consists of at least one closed plastic envelope in the form of at least one tube or sacket which defines a single compartment; and which contains at least one fluid product capable of diffusing or migrating to the outside of said at least one envelope so as to go through at least part of said envelope, this occurring as a function of the involved time and the ambient temperature or temperatures affecting said merchandise, whereby the ageing of the associated merchandise can be evaluated by determining the amount of fluid lost through and by escape from said at least one closed envelope, the plastic of said envelope being selected from the group comprising of polyethylene, polypropylene, polyvinyl chloride, polymers of acrylonitrile, polymers of ethylene tenephthelate, polystynene, acetate polymens and elastomers.

3. An ageing indicator that is in accordance with that of claim 1, wherein:

the said at least one closed envelope is in the form of a plastic tube or sachet; and wherein it is intended to give only one indication of the aging of the merchandise to be monitored, this indication consisting of information printed on the indicator; with said tube or sachet being of a closed construction having two large faces thereon, one of the large faces of which carries information, whilst the other large face through which the information is read is transparent;

the said tube or sachet initially being filled with an opaque product which obscures the information and which provides the migrating fluid; and further wherein said opaque product used is selected from the group consisting of water, colored solvents and opaque emulsions which become transparent on the elimination of a volatile constituent.

4. An indicator according to that of claim 3, wherein the plastic constituting said envelope is selected from the group consisting of polyethylene, polypropylene, polyvinyl chloride, polymers of acrylonitrile, polymers of ethylene terephthalate, polystyrene, acetate polymers and elastomers.

5. An indicator according to any one of claim 2, wherein said at least one closed envelope contains at least one product selected from the group consisting of water, alcohols, solvents, mixtures of the above-mentioned constituents and vapours of sublimable solids.

6. An indicator according to any one of claim 2, wherein said at least one closed envelope includes a removable covering which is impermeable to the fluid contained in the envelope, said covering being intended to be removed when the indicator is to be used.

7. An indicator according to claim 6, wherein said impermeable covering consists of a detachable aluminium foil which adheres to said at least one closed permeable envelope.

8. An indicator according to any one of claim 2, wherein said at least one envelope is in the form of a tube of essentially uniform wall thickness and made of plastics material, this tube being associated with a graduated scale and the ageing being assessed by comparing the fluid level inside the tube with the graduations on the scale.

9. An indicator according to claim 8, wherein each graduation on the scale corresponds to a time for which, at a predetermined constant temperature, the fluid has been migrating through the envelope.

10. An indicator according to claim 8, wherein each graduation on the scale corresponds to an indication of the deterioration of the merchandise to be monitored.

11. An indicator according to any one of claim 2, wherein said indicator is associated with a temperature indicator, whose purpose for temperature-indicating purposes is to show any excess over the limiting temperature for stability of the merchandise to be monitored, this temperature indicator being one product selected from the group consisting of irreversible heat-sensitive ink, waxes and paraffins, the melting point of any of which is the limiting temperature for stability of the merchandise.

12. An indicator according to any one of claim 2, wherein it is intended to give only one indication of the ageing of the merchandise to be monitored, this indication consisting of information printed on the indicator.

13. An indicator according to claim 12, wherein it is in the form of a closed sachet having two large faces thereon one of whose larger faces carries information, whilst the opposite other large face through which the information is read consists of a translucent film which remains transparent when it is in contact with the liquid contents of the sachet, and which again becomes translucent and makes it impossible to read the information when the said sachet is essentially empty.

14. An indicator according to claim 13, wherein the translucent film is made of polypropylene and the liquid contents of the sachet are selected from the group consisting of a water-soluble alcohol, water and mixtures thereof.

15. An indicator according to claim 12, wherein it consists of a closed sachet having two large faces thereon, one of the large faces of which carries information, whilst the other large face through which the information is read is transparent, said sachet initially being filled with an opaque product which obscures the information and which provides the migrating fluid.

16. An indicator according to that of claim 15, wherein said opaque product generates said migrating fluid.

17. An indicator according to that of claim 15, wherein said opaque product constitutes said migrating fluid.

* * * * *